Jan. 10, 1961  B. E. ZWAYER  2,967,672
WINDING FORM
Filed Nov. 14, 1955  5 Sheets-Sheet 1

Inventor:
Bard E. Zwayer,
by *Robert G. [signature]*
His Attorney.

Jan. 10, 1961  B. E. ZWAYER  2,967,672
WINDING FORM

Filed Nov. 14, 1955  5 Sheets-Sheet 3

Inventor:
Bard E. Zwayer,
by *[signature]*
His Attorney.

Jan. 10, 1961   B. E. ZWAYER   2,967,672
WINDING FORM
Filed Nov. 14, 1955   5 Sheets-Sheet 4
Fig. 5.
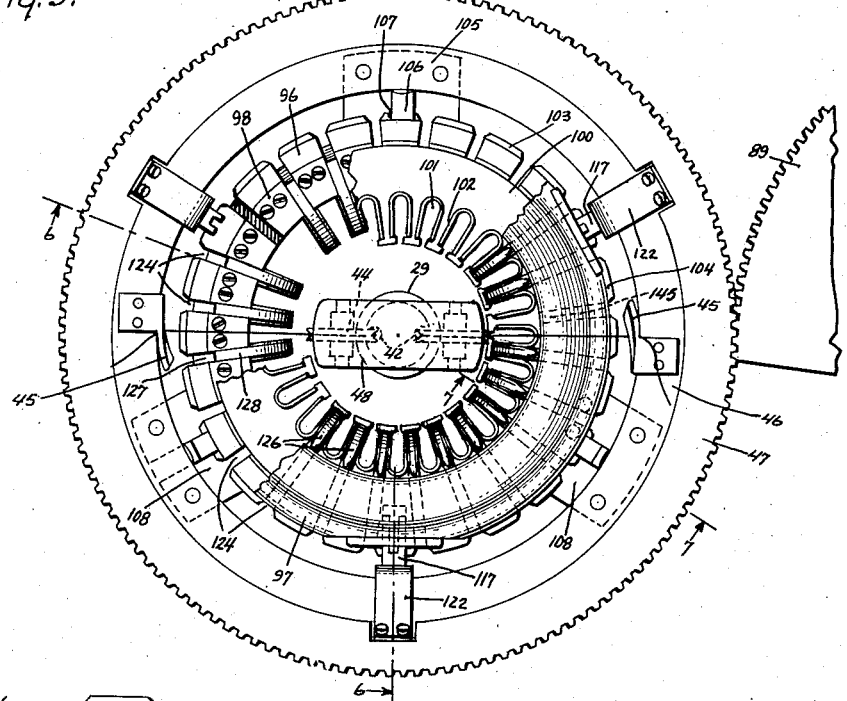
Fig. 6.
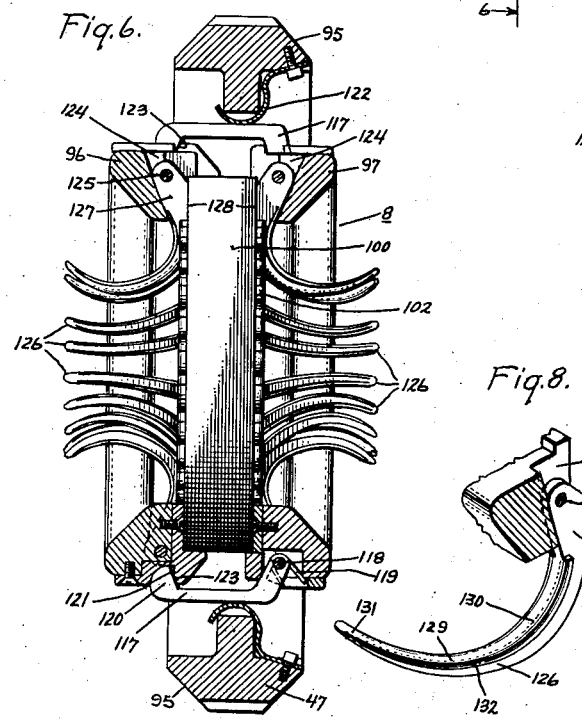
Fig. 7.
Fig. 8.
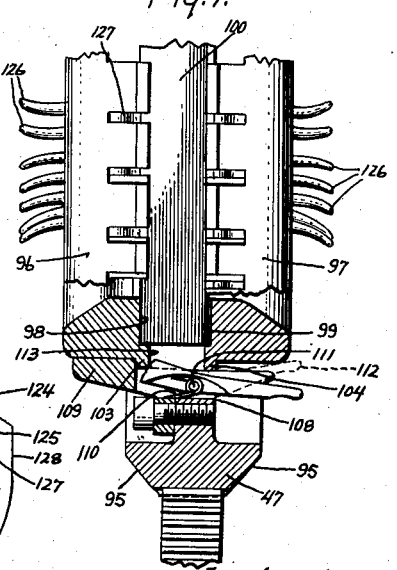
Inventor:
Bard E. Zwayer,
by *Robert G. True*
His Attorney.

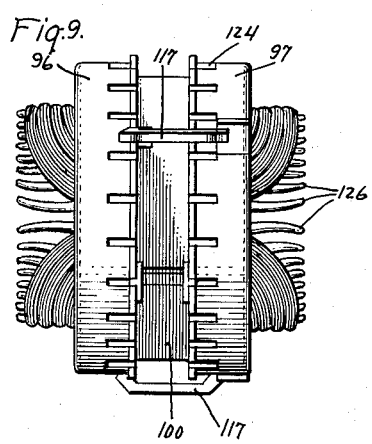
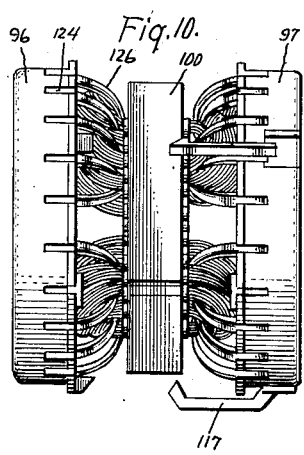
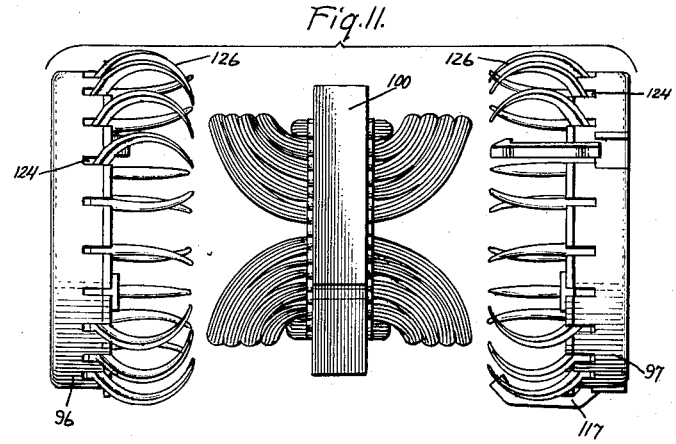
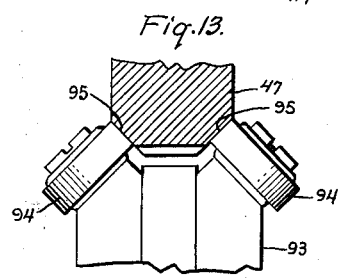
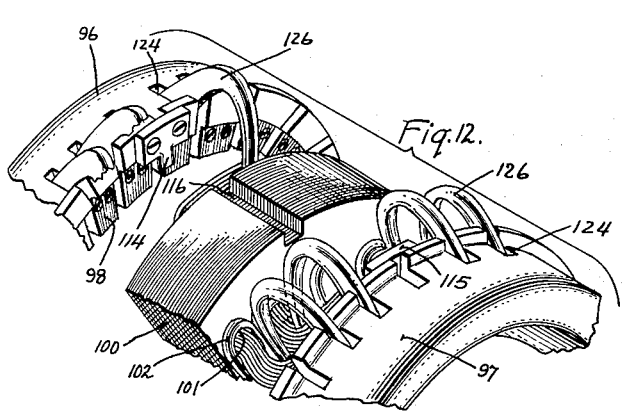

United States Patent Office 2,967,672
Patented Jan. 10, 1961

2,967,672

WINDING FORM

Bard E. Zwayer, Fort Wayne, Ind., assignor to General Electric Company, a corporation of New York Filed Nov. 14, 1955, Ser. No. 546,454

12 Claims. (Cl. 242—1.1)

This invention relates to the winding of coils on magnetic cores, and more particularly to a winding form to be used to hold a slotted dynamoelectric machine stator core in a winding machine of the type which winds coils directly into the slots.

Induction-type electric motors are highly desirable for a great number of applications because of the relative simplicity of such motors and the economy possible in the manufacture thereof. Such motors, operated from a source of alternating current power, are provided with a rotatably mounted rotor member of magnetic material having a plurality of conductors extending therethrough and short circuited together at their ends. Surrounding the rotor member, and generally mounted so as to be stationary, there is provided a stator core of magnetic material having a predetermined number of poles formed thereon, generally by wire wound into slots which are formed in the stator member. The running of such motors is effected by the interaction of the stator coil current and the induced current in the rotor conductors, which, in effect, set up a rotating field in the stator. For a given frequency and a given voltage, the field will rotate from pole to pole at a predetermined speed regardless of the total number of poles provided on the stator. Because of this, all other factors being maintained equivalent, a two pole induction-type motor will rotate twice as fast as a four pole induction-type motor, since in the latter the electrical field must pass through twice as many poles. The higher speed obtainable with motors having smaller numbers of poles, such as two pole motors, is most desirable in those applications where the effectiveness of the motor is measured by its speed. This occurs, for instance, in almost all pumping applications including, specifically, those induction-type motors which are in almost universal usage in the refrigerating system of the modern electric household refrigerator.

Despite the desirability of two pole motors for such applications, it is very frequently found that motors having considerably higher numbers of poles are being utilized. This arises from the fact that various difficulties present themselves to the mass production of two pole induction-type motors. Among the most important of these difficulties, and the one which has, to a great extent, effectively precluded such mass production, is the fact that the span of each coil in a two pole motor is such that machine-wound coils would normally have their end turns extending straight across the bore of the stator. A two pole motor often has a span on the order of 165 degrees for each pole, and therefore the end turns would frequently extend almost across the center of the bore with the result that it was practically impossible to force them back to a position where they would not preclude operation of the rotor within the stator. To overcome this difficulty, apparatus was provided to prevent the end turns from being so formed. Such apparatus was generally so intimately associated with the stator that a great deal of time had to be consumed in the removal of the apparatus after the winding operation because of the fact that the coils had been wound in place right over the apparatus.

To remedy this situation, it is most desirable that there be provided a winding form, for use in a winding machine of the type which winds coils directly into the slots of a stator core, which will position the end turns of the coils with a relatively high degree of precision so as to preclude their extending into the bore, and which will be easily and quickly removable from the stator after the coils have been formed. It is further desirable that the separation of the winding form from the stator with the formed coils thereon be effected independently of the machine on which the winding operation is performed, to permit the commencement of another operation as soon as one is finished simultaneously with the final separation of the winding form from the stator.

It is, therefore, an object of this invention to provide a winding form which will incorporate the advantageous features set forth above.

Further objects and advantages of this invention will become apparent and the invention will be better understood by reference to the following description and the accompanying drawings, and the features of novelty which characterize this invention will be pointed out with particularity in the claims annexed to and forming a part of this specification.

In its broader aspect, this invention provides a winding form for holding a slotted stator core in a winding machine of the type which winds coils directly into the slots. The form includes a pair of annular members each of which has a side formed to receive one end of a core to be wound. The members are respectively adapted to be positioned with their formed sides against the ends of the core, and means are provided to secure the members together when they are so positioned. Each member has a plurality of finger members which are movably secured thereto so as to extend substantially axially away from the core when the members are positioned at the ends thereof and which are formed to receive and position the end turns of a coil wound in the slots of the core. The two annular members are movable away from the core along the axis thereof after they have been secured thereto and a winding operation has been performed. When the members are moved in this manner, each of the fingers is arranged to move under the coil end turns which have been formed, from a radially inward position to a position where it is radially entirely outside the coil. This permits each member to be quickly disengaged from the core simply by moving it axially away from the core after the winding operation.

In the drawing:

Figure 5 is an enlarged view, partly broken away, of a part of the structure shown in Figure 3;

Figure 6 is a view along line 6—6 in Figure 5;

Figure 7 is a view along line 7—7 in Figure 5;

Figure 8 is an enlarged fragmentary view in perspective of one of the finger members of the improved winding form of this invention;

Figure 9 is a side view of the improved winding form of this invention positioned about a core member after the completion of a winding operation;

Figure 10 is a view of the winding form of this invention in the process of being removed from the wound core;

Figure 11 is a view of the winding form of this invention after completion of the removal thereof from the wound core;

Figure 12 is a fragmentary view in perspective of the winding form of this invention during the separation thereof from the wound core; and Figure 13 is a view along line 13—13 in Figure 3.

Figure 1:
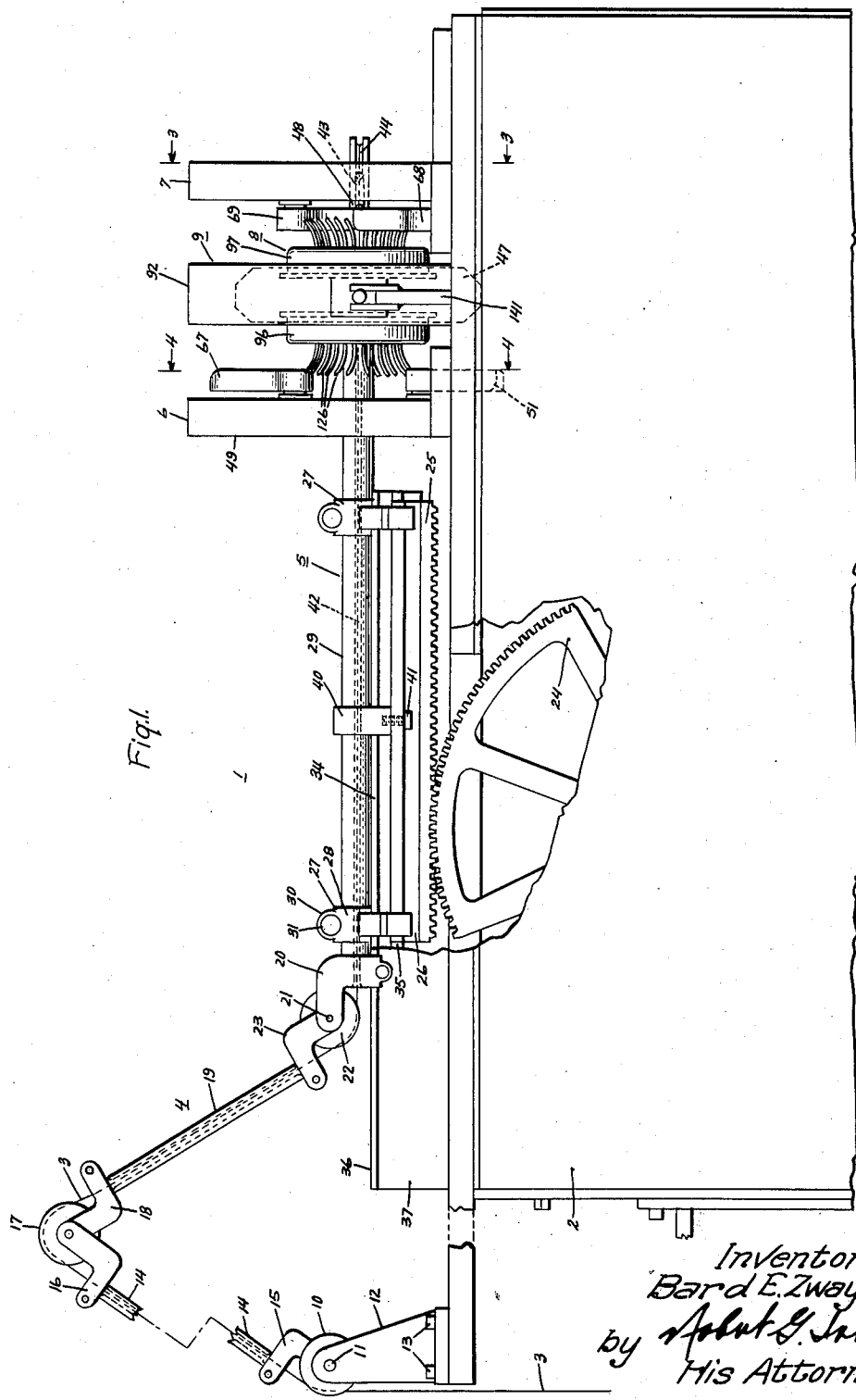
Figure 1 is a side elevational view, partly broken away, of a representative winding machine including the improved winding form of this invention.
Figure 2:
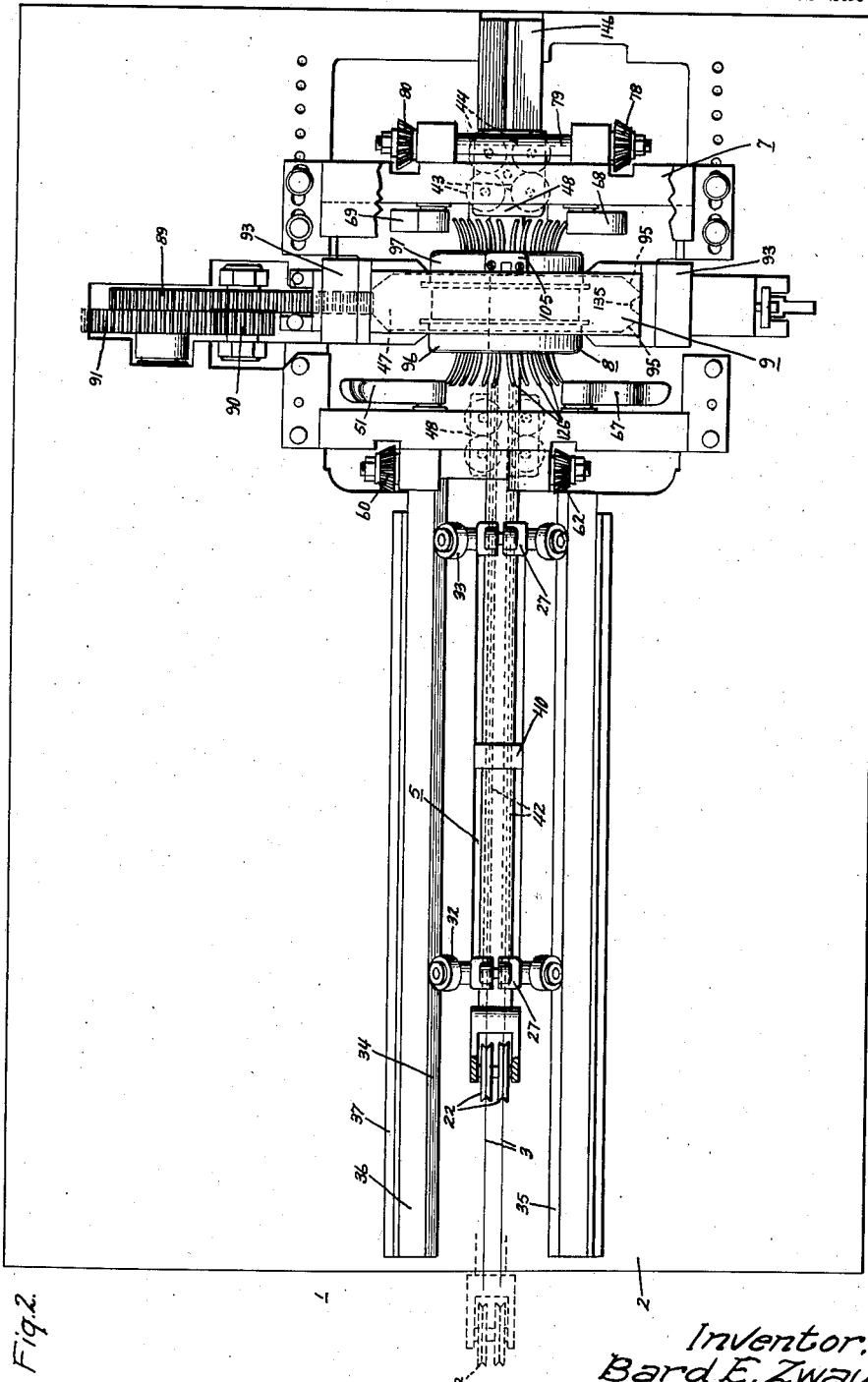
Figure 2 is a plan view of the machine including the improved winding form.

Referring now to Figures 1 and 2 of the drawings, there is shown a winding machine, generally indicated at 1, securely mounted on a supporting assembly 2. Briefly, two lines of magnet wire 3 are supplied through apparatus 4 to a wire gun assembly 5 which, in combination with a pair of hook assemblies 6 and 7, effects the winding of coils on a stator core held in winding form 8 which in turn is maintained within a rotatable assembly 9 of machine 1. All of the assemblies numbered 4, 5, 6, 7, 8 and 9 will be explained in greater detail herebelow.

Describing now assembly 4 in particular, the wire 3 is fed from any desired source (not shown) over a pair of pulleys 10 rotatably mounted on a pin 11 secured within a bracket 12 which in turn is attached to the base by any desired means such as bolts 13. The wire is then fed through a tube 14 which is secured at its two ends to angle members 15 and 16 respectively. Member 15 is secured to bracket 12, and member 16 is, in turn, secured at its other end to a pair of rotatably mounted pulleys 17 and another angle member 18. The wire passes from tube 14 over pulley 17 and then through a tube 19 which is secured at one end to angle member 18 and at the other end to an angle member 23. Member 23, in turn, is pivotally secured to a bracket member 20 on a pin 21 which also supports a pair of pulley members 22 in rotatable relation to bracket member 20. The bracket member is rigidly secured to the back of gun assembly 5 so as to be movable therewith. Wire 3 passes from tube 19 under pulleys 22 and then into wire gun assembly 5 which is now to be described. While assembly 4 has been described in substantial detail for complete understanding of machine 1, it will be understood that any desired means of feeding wire into gun assembly 5 under a satisfactory substantially predetermined tension may be utilized.

Gun assembly 5 is movable in a direction axially of the core to be wound, as will be further explained below. In order to effect this action, there may be provided a segmental gear 24 arranged in engagement with a rack member 25 which in turn is secured to a T member 26 which supports assembly 5. Motivation of gear 24 in a clockwise direction to move assembly 5 to the right as viewed in Figures 1 and 2 and in a counterclockwise direction to move assembly 5 to the left, may be effected by any desired mechanism. Such mechanism does not constitute any part of this invention, may be any one of several standard types, and is therefore not shown or described herein.

Figure 4:
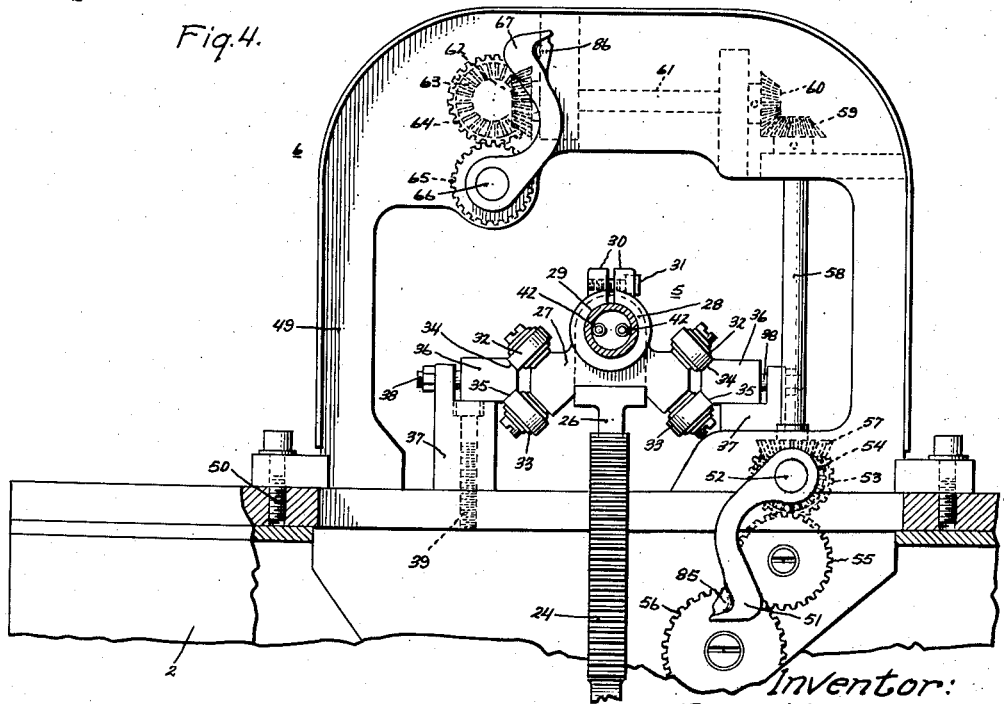
Figure 4 is a view along line 4—4 in Figure 1.

Referring to Figure 4 in addition to Figures 1 and 2, there is provided a pair of bracket members 27 respectively secured to T member 26 adjacent its ends. Each bracket member is provided with a split portion 28 forming a circular recess within which tube member 29 is supported. Brackets 27 are each secured to member 29 by the provision of lugs 30 joined by threaded member 31. By tightening the threaded member, the two parts of the split portion 28 are brought together to tighten the bracket on the tube 29.

Each bracket 27 is provided on each side with a pair of roller members 32 and 33 which are respectively arranged to be rotatable over tracks provided by surfaces 34 and 35 of a block 36 which is rigidly and adjustably secured on support 37 by threaded member 38. Support 37, in turn, is mounted on the face 2 of the machine by any desired means such as threaded members 39. Block 36 and support 37 are formed to extend along base 2 a distance sufficient to permit engagement of surfaces 34 and 35 with rollers 32 and 33 respectively during movement of assembly 5 from its extreme forward position (shown in Figure 1) to its extreme back position (in dotted outline in Figure 2). Through this arrangement, brackets 27 are arranged to be guided horizontally, as seen in Figures 1 and 2, by engagement of rollers 32 and 33 with track surfaces 34 and 35 respectively. Thus, when movement of segmental gear 24 causes a horizontal movement of rack 26, this will be transmitted through the brackets 27 to tube 29 of assembly 5 to cause the gun assembly to move horizontally. For complete rigidity of the gun assembly, an additional support 40 may be provided to secure tube 29 to T member 26 by any desired structure such as, for instance, threaded members 41.

A pair of tubular wire guides 42 extend through tube 29 to guide the wire through the tube to front portion 48 of the gun assembly 5. Two pairs of pulleys 43 and 44 are mounted on front portion 48, and each wire 3 is guided over the inner surface of a pulley 43 between it and pulley 44, and is then secured to a hook 45 which is fastened to the inner part 46 of a ring gear member 47 to be further described herebelow.

As previously stated, hook assemblies 6 and 7 are mounted in cooperative relationship with wire gun assembly 5. Hook assembly 6 includes a housing and support structure 49 which is secured to base 2 by any desired means such as bolts 50. A hook member 51 is rotatably mounted on structure 49 by means of a shaft 52 which also supports a spur gear 53 and a bevel gear 54. Spur gear 53 is driven through gears 55 and 56 which transmit rotary motion from a source (not shown) to the hooks 51. This motion is then transmitted through bevel gears 54 and 57, shaft 58, bevel gears 59 and 60, shaft 61, bevel gears 62 and 63, and spur gears 64 and 65 to a shaft 66 on which is mounted a second hook member 67 similar in all respects to hook member 51. By means of this transmission of motion, hook members 51 and 67 move in synchronism.

Referring now to Figures 1, 2, 3 and 4, it will be seen that hook assembly 7 is substantially similar to hook assembly 6. A pair of hook members 68 and 69 are provided; hook member 68 is driven through gears 70, 71 and 72, in the same manner as hook 51. In addition, shaft 73 on which hook 68 is mounted drives hook member 69 in synchronization with hook member 68 through bevel gears 74 and 75, shaft 76, bevel gears 77 and 78, shaft 79, bevel gears 80 and 81, spur gears 82 and 83, and shaft 84.

Hooks 51, 67, 68 and 69 are respectively provided with recessed configurations, shown respectively at 85, 86, 87 and 88, which permits the fingers to pick up wire as they swing around and to release the wire when the gun assembly 5 moves (as will be more fully explained below).

Figure 3:
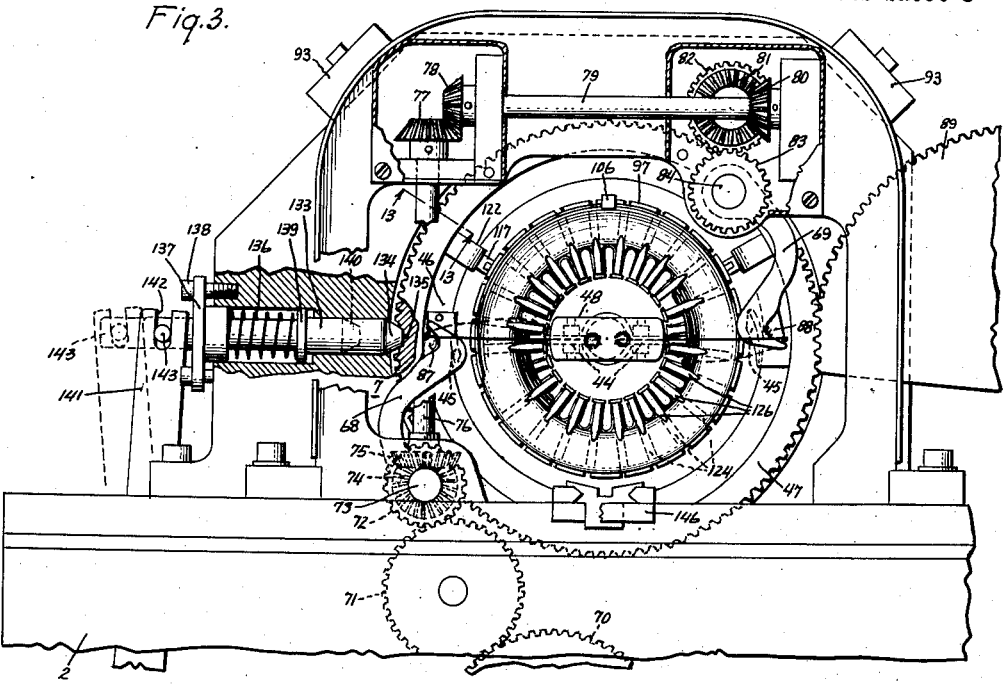
Figure 3 is a view along line 3—3 in Figure 1.

The rotatable assembly 9 for holding the core to be wound includes an externally toothed ring gear 47 arranged to mesh with a large segmental gear 89 (Figure 2) mounted on the same shaft as a pinion 90 rotated by engagement with gear 91 which in turn is rotated by any desired means (not shown). Ring gear 47 is rotatably supported within its housing 92 by means of 4 equally spaced inwardly extending members 93 (only two are visible in the drawings) which are secured to the housing and have their inner ends formed as shown in Figure 13, with roller members 94 rotatably secured thereto. The roller members are arranged to roll on beveled surfaces 95 of the ring gear 47 on each side of the toothed outer portion thereof. Reference to Figures 2 and 3 will show the outer ends of two of the members 93; two similar members are positioned beneath the ring gear but for greater clarity of the other features of the machine have not been included in the figures of the drawings. It will thus be seen that ring gear member 47 is supported within its housing 92 by the provision of a plurality of members 93 so as to be freely rotatable by segmental gear 89.

A member 133 (Fig. 3) slidably mounted in housing part 92 has a nose piece 134 which fits into a recess 135 in the outer surface of ring gear 47 so as to prevent rotation thereof. Member 133, is biased to the rotation-preventing position by a spring 136 which is seated at one end against a stationary member 137 secured to the housing 92 by any desired means such as bolts 138, and at its other end against a flange 139 formed on member 133. A lever member 141 having a slot 142 is positioned so that a pin 143 extending from member 133 is seated in the slot 142. By this arrangement, lever 141 can move member 133 against the bias of spring 136 to the position shown in dotted outline by the numeral 143. With member 133 in the position shown at 143, the ring gear is left free to rotate. Lever member 141 is synchronized by any desired means (not shown) with the apparatus causing rotation of ring gear 47 so that the ring gear is stopped in a precise predetermined position at the end of its rotational movement as will be further set forth below.

Referring now to Figures 5, 6, 7, and 8, there is provided a winding form assembly 8 which includes two substantially annular members 96 and 97, respectively provided on one side with recesses 98 and 99 to receive the ends of a stator core member 100 formed of magnetic material which is to have a coil wound thereon. Core member 100 is provided with slots 101 in which the coils are to be wound, and slot insulation such as that shown at 102 may be provided within each slot before the winding operation in order to afford additional protection against any electrical contact between the wire and the magnetic material of the core. The inner diameter of members 96 and 97 is preferably at least as great as the diameter of the slotted part of the core in order to facilitate the placing of wire in the slots. Members 96 and 97 are respectively provided with peripheral flanges 103 and 104 (Figure 7) at the edge of the same side in which recesses 98 and 99 are formed; thus, when the two members are mounted in position against the ends of a stator core 100, flanges 103 and 104 are at the inner edges of the members.

A locater part 105 (Figure 5) is secured to the inner surface of ring gear 47, and a key 106 is arranged to extend inwardly therefrom. Winding form assembly 8 may be precisely positioned within ring gear 47 for a winding operation simply by aligning a single groove 107 formed across the surface of both members 96 and 97 with key 106. Assembly 8 is then secured into position, with key 106 positioned in groove 107, by locking assemblies 108 arranged on the inner surface of ring gear 47. As best shown in Figure 7, each assembly 108 includes a stop member 109 against which the peripheral flange of whichever of members 96 and 97 is facing in that direction is positioned. In the particular instance shown, it happens that member 96 is facing in that direction, and therefore flange 103 is arranged against part 109, but it will be understood that, while there are differences between members 96 and 97 which will be explained herebelow, they may be arranged within ring gear 47 regardless of these differences. Once flange 103 is in contact with part 109, a spring 110 positioned on pin 111 will bias a latch member 112 against surface 113 of member 96 thereby to lock the member into position with its flange 103 against part 109. Member 96 may be released simply by moving latch part 112 against the biasing of spring 110 to the position shown in dotted outline in Figure 7.

Referring for an instant particularly to Figure 12, the positioning of members 96 and 97 with regard to the stator to be wound is maintained as desired by the provision of keys 114 and 115 on members 96 and 97 respectively. Each of keys 114 and 115 must be positioned to fit within an axial recess 116 formed on the outer surface of the stator core before members 96 and 97 can be positioned with respect to the stator so that it fits snugly within recesses 98 and 99 respectively.

Once the two members 96 and 97 are in position about the stator, they are maintained as an assembly in this position by the provision of latch members 117 (Figure 6) which are pivotably secured on pins 118 to member 97. Spring members 119 are provided to bias the latch members 117 to the position shown in Figure 6, and when the members 96 and 97 are in position, the end 120 of each latch member 117 is positioned in a recess 121 in member 96 so as to lock the two members together. To ensure that the assembly remains in this relationship, ring gear 47 is provided with spring members 122 which are so positioned that when members 96 and 97 are mounted on the stator as set forth with respect to Figure 12, and the assembly 8 is then mounted within the ring gear as set forth in Figures 5 and 7, each spring member 122 is aligned with a latch 117 to force the latch inwardly into locked position. It will be observed that moving the assembly axially into the ring gear will automatically effect this locking action; this movement may be effected, for instance, by providing a guide 146 (Fig. 2) on which the assembly 8 is slid into position within the ring gear.

However, each latch 117 has a sloped base 123 (Figure 6) so that when the assembly 8 is removed from machine 1, the application of sufficient axial force on each of the members to cause it to move axially away from the stator member 100 will cause the latch member 117 to slide up out of the recess 121 to disengage the members from each other.

Each of the members 96 and 97 is provided with a plurality of peripherally equispaced slot-like recesses 124 formed in the side of the member which is against the core 100, and extending throughout the radial thickness of the member. Each recess 124, except for two diametrically opposite recesses 145 (Figure 5), has a pin 125 (Figure 8) mounted therein and a finger member 126 is mounted on pin 125 so as to be pivotable substantially in a plane passing through the axis of the core to be wound. Recesses 145 divide fingers 126 into two groups, each of which is intended to position the end turns of one pole. Each finger has a portion 127 adjacent pin 125 which is arranged to slide within slot 124 as the finger pivots about the pin. In addition, the back portion 128 of each pin is formed so as to be entirely flat and parallel to the end surface of the stator core when the same is locked in between the two members 96 and 97. Back surface 128 of each finger is preferably slightly raised from the surfaces of recesses 98 and 99 when it is parallel thereto, so that in effect the stator 100 is locked between the surfaces 128 of the fingers of each member. The remainder of each finger 126 extending out of the slot 124 is preferably provided with a predetermined curvature, as will be more fully discussed herebelow. This curvature is preferably such that the finger first extends inwardly, as shown at 130, toward the axis of the core member 100 held between members 96 and 97, and then slightly outwardly, as shown at 131, to provide a recess 132. As can best be seen in Figures 3 and 5, fingers 126 are positioned precisely between the slots when parts 96 and 97 are locked about the core 100 so that they will not interfere with the winding of the wire into the slots as will be described herebelow.

Referring now to Figures 1, 2, 3 and 4 of the drawings, the operation of the machine will be described for the winding of a two pole stator core. Let it be assumed that at the start of the winding operation the machine is in the position shown in Figures 1 and 2, with gun assembly 5 in its forward-most position. The two lines of magnet wire 3 are fastened to hooks 45 over the hooks 68 and 69 respectively. Member 133 is in rotation-preventing position (Figure 3). Wire gun assembly 5 then starts to move back through the winding form assembly 8. As it does so, it pulls the wire off the fingers 68 and 69 which may be shaped to permit easy removal of the wire therefrom by the movement of the wire gun through the winding form 8. However, by the time the wire has been removed from hooks 68 and 69, it has already been guided between two fingers 126. As can best be seen in Figure 3, this means that the wire will be guided between the fingers into a predetermined slot as the wire gun assembly retreats through the winding form assembly 8. At the time that the wire gun assembly 5 reaches its rear-most position, the wire will have been pulled through a predetermined stator slot. At this point, the two rear assembly hooks 51 and 67 will rotate into the position shown in Figure 3 for the forward hooks 68 and 69 so as to pick up the wire. It is preferable to cause the hooks to pause in this position; such action may be simply effected by a variety of well-known means such as, for instance, utilizing a Geneva movement in the actuation of the hooks.

With the wire gun assembly in its rear-most position and the hooks 51 and 67 holding the wire, member 133 is moved back to permit ring gear assembly 9 to rotate, carrying with it winding form assembly 8. This rotation, which is over a predetermined arc, causes the wire to pass over fingers 126 for a distance determined by the amount of rotation. As the rotation ceases (with member 133 again locking ring gear 47), the wire gun assembly 5 starts to move forward, stripping the wire off the hooks 51 and 67. Again, however, this occurs after the wire gun assembly has moved forward sufficiently to guide the wire between two of the fingers 126 so that the wire returns through the stator core 100 in a predetermined slot 101. It will be observed that, at this point, an end turn of a single turn of wire has been formed over the rear fingers 126.

The gun assembly moves forward guiding the wire through the proper stator slot. At it reaches its forwardmost position, hooks 68 and 69 move into their operative positions to pick up the wire. The ring gear then rotates in the same manner as before to cause the wire to pass over the forward fingers 126 for a predetermined amount of arc. The wire gun then moves back to pull the wire off the forward hooks 68 and 69 after the wire has been guided between a predetermined two of the fingers 126. As the wire gun assembly moves back, it will carry the wire through a predetermined slot. It will be observed that, at this point, a single end turn has been formed over the forward fingers for each pole of the machine. This action continues until the entire pole is formed. It will, of course, be understood that indexing apparatus (not shown) is preferably provided to cause the correct number of turns to be wound into the various slots in a manner which is well known in the art.

The operation of the winding machine has been set forth in some detail to elucidate the description which follows the operation and function of the winding form 8. It will therefore be understood that while the tooling of the machine has been described in some detail, this has been done for purposes of illustration, and that the invention is not limited to use with the particular configurations or the particular elements which are shown in the winding machine. Rather, the winding machine is intended to be representative of a general type of machine in which the novel winding form of this invention may be used.

When the winding operation is complete, the winding form assembly 8 may be removed with ease by moving member 112 (Figure 7) to the position shown in dotted outline and sliding the winding form assembly out from within the ring gear 47. The wires coming from the wire gun assembly are cut to release assembly 8; the wires from the gun assembly may then be secured to the hooks 45 in readiness for the subsequent operation. At this point, the coils will be entirely formed on the core 100 and will be positioned over the fingers 126 as is best seen in Figure 9. In addition, the two members 96 and 97 will be maintained together by engagement of latch members 117 within recesses 121, as previously described. The latch members 117 may be moved out of locking position by any desired means. This may be effected by the application of force to the two members 96 and 97 to move them away from each other along the axis of core member 100. As explained, the slanted surface 123 of each latch member 117 will cause it to slide out of the recess 121 when this is done which will also effect the unlocking action. Once the two members 96 and 97 have been released from the locking action of latch member 117, a continued force is applied to them to force them away from each other along the axis of stator core 100. As the two members 96 and 97 are moved away from core member 100, the fingers 126 of each member pivot respectively about pins 125. Previously, the pins were locked in the position shown in Figure 9 because of the fact that their flat back surfaces 128 were positioned against the sides of the stator core. However, the movement of the members 96 and 97 permits the pivoting or camming action which is caused by the slight force exerted by the coils on the fingers as the two members 96 and 97 are moved axially. In the present case, each finger 126 has been formed in the shape of an involute, since it has been discovered that this type of curve is such that pressure exerted by the fingers on the coils as they turn or pivot about pins 125 is held to a minimum. However, other curvatures may be provided for fingers 126 with equally great success. Thus, two other examples of curves which may be used in the formation of fingers 126 are a logarithmic spiral, and a parabolic spiral. While these three types of curves have all been tested and found to be desirable, there is no intention to restrict the invention only to these three particular curves; the prime requirement is that the fingers have a shape which is suitable for positioning the end turns of the coil wound in the slots of core 100 and also for angularly moving under the coil end turns during axial movement of the member in such a manner that it does not exert undue pressure on any part of the end turns so as to harm the magnet wire.

As the axial movement of members 96 and 97 away from core 100 is continued, the fingers 126 continue to pivot about pins 125 under the influence of the pressure of the coils against the fingers until they reach a position, as shown in Figure 11, where they are entirely radially outside the formed coil. When the fingers reach this position, it is, of course, possible to remove the members 96 and 97 entirely from the coil and to replace them on a new unwound core for a winding operation.

It will thus be seen that this invention provides a winding form which positions the end turns of the coils during a winding operation in a desired manner so that the end turns will be suitably placed at the end of the winding operation. In addition, the winding form for achieving this result is such that after the operation has been completed the form may be simply and speedily removed from the core with the coils wound thereon, and placed on an unwound core to repeat the winding operation. It will further be observed that this invention is particularly valuable in the winding of two pole stators in view of the fact that the large arc of each pole will cause the end turns to extend across the bore of the stator unless provision is made to maintain the end turns out of the bore and in a desired predetermined position. However, while the invention is particularly well adapted to making the production of machine-wound two pole induction-type motors practical, it is equally applicable to machines having greater numbers of poles where, for whatever reason, positive means for predetermining the position of the end turns is desired.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. A winding form for use in a winding machine of the type which winds coils directly into the slots of a dynamoelectric machine stator core comprising: a pair of annular members each having a side formed to receive one end of the core, said members being respectively adapted to be positioned at the ends of the core with their formed sides thereagainst and adapted to be moved axially away from said core, means for securing said members together when they are positioned at the respective core ends, a plurality of finger members each having outer surfaces for receiving and positioning the end turns of a coil wound in the slots of a core, means for mounting said finger members on each of said annular members for angular movement relative to said annular members, each of said finger members extending substantially axially away from the core when said annular members are positioned at the ends thereof, said outer surfaces of said finger members engaging said end turns for angularly moving said finger members from a position radially inwardly of said end turns to a position radially outwardly thereof upon the movement of said annular members axially away from said core, thereby to permit the separation of said annular members from said core.

2. A winding form for use in a winding machine of the type which winds coils directly into the slots of a dynamoelectric machine stator core comprising: a pair of annular members each having a side formed to receive one end of the core and each having an inner diameter at least as great as the diameter of the slotted part of the core, said members being respectively adapted to be positioned at the ends of the core with their formed sides thereagainst and adapted to be moved axially away from said core, means for securing said members together when they are positioned at the respective core ends, a plurality of finger members formed with outer curved surfaces for receiving and positioning the end turns of a coil wound into the slots of a core, means for mounting a predetermined number of said finger members on each of said annular members for turning movement relative to said annular members, each of said finger members extending substantially axially away from the core when said annular members are positioned at the ends thereof, said outer surfaces engaging said end turns for turning said finger members from a position radially inwardly of said end turns to a position radially outwardly thereof upon the movement of said annular members axially away from said core, thereby to permit the separation of said annular members from said core.

3. A winding form for use in a winding machine of the type which winds coils directly into the slots of a dynamoelectric machine stator core comprising: a pair of annular members each having a side formed to receive one end of the core, and each having an inner diameter at least as great as the diameter of the slotted part of the core, said members being respectively adapted to be positioned at the ends of the core with their formed sides thereagainst and adapted to be moved axially away from said core, means for securing said members together when they are positioned at the respective core ends, said members each including a plurality of finger members each having a curved portion formed with an outer surface for receiving and positioning the end turns of a coil wound in the slots of the core, means for mounting a predetermined number of said finger members on each of said annular members for turning movement relative to said annular members, said curved portions extending substantially axially away from the core when said annular members are positioned at the ends of said core, said outer surfaces engaging said end turns for turning said curved portions from a position radially inwardly of said end turns to a position radially outwardly thereof upon the movement of said annular members axially away from said core, thereby to permit the separation of said annular members from said core.

4. A winding form for use in a winding machine of the type which winds coils directly into the slots of a dynamoelectric machine stator core comprising: a pair of annular members each having a side formed to receive one end of the core and each having an inner diameter at least as great as the diameter of the slotted part of the core, said members being respectively adapted to be positioned at the ends of the core with their formed sides thereagainst and adapted to be moved axially away from said core, means for securing said members together when they are positioned at the respective core ends, each of said members having a plurality of substantially radially extending recesses formed along said one side, a plurality of finger members each having a curved portion, said finger members being respectively pivotably mounted within said recesses so that said curved portions extend substantially axially away from the core at the inner edge of each of said annular members when said annular members are respectively positioned at the ends of the core, said curved portions having outer surfaces for receiving and positioning the end turns of a coil wound in the slots of the core, said outer surfaces engaging said end turns for camming said curved portions from a position radially inwardly of said end turns to a position radially outwardly thereof upon movement of said annular members axially away from said core, thereby to permit the separation of said annular members from said core.

5. A winding form for use in a winding machine of the type which winds coils directly into the slots of a dynamoelectric machine stator core comprising: a pair of annular members each having a side formed to receive one end of the core and each having an inner diameter at least as great as the diameter of the slotted part of the core, said members being respectively adapted to be positioned at the ends of the core with their formed side thereagainst and adapted to be moved axially away from said core, means for securing said members together when they are positioned at the respective core ends, each of said members having a plurality of radially extending slot-like recesses formed in said one side, a plurality of finger members each having a curved portion, said finger members being respectively pivotally secured in said recesses, each of said finger members having a flat portion adjacent one end arranged to seat against the core when said annular members are positioned at the ends of the core, each of said finger members having an outer surface for receiving and positioning the end turns of a coil wound in the slots of the core when said flat portion is seated against the core thereby projecting said curved portion substantially axially away from the core from the inner edge of each of the members, said outer surfaces engaging said end turns and being cammed from a position radially inwardly of said end turns to a position radially outwardly thereof upon the movement of said annular member axially away from said core, thereby to permit the separation of said annular members from said core.

6. A winding form for use in a winding machine of the type which winds coils directly into the slots of a dynamoelectric machine stator core comprising: a pair of annular members each having a side formed to receive one end of the core and each having an inner diameter at least as great as the diameter of the slotted part of the core, said members being respectively adapted to be positioned at the ends of the core with their formed sides thereagainst and adapted to be moved axially away from said core, means for securing said members together when they are positioned at the respective core ends, each of said members having two groups of circumferentially equispaced radially extending slot-like recesses formed in said one side thereof, a plurality of finger members respectively pivotally secured in said recesses, each of said finger members having a substantially flat surface provided adjacent the pivoted end thereof, said surface being arranged to be in engagement with the end of the core when said members are secured together, said finger members each having a curved portion arranged to extend substantially axially away from the core from the inner diameter of said annular members when the flat portion of each finger member is in engagement with the end of the core, said curved portion of each of said fingers having an outer surface for receiving and positioning the end turns of a coil wound in the slots of the core, said outer surfaces engaging said end turns for camming said finger members from a position radially inwardly of said end turns to a position radially outwardly thereof upon the movement of said annular members axially away from said core, thereby to permit the separation of said annular members from said core.

7. A winding form for use in a winding machine of the type which winds coils directly into the slots of a dynamoelectric machine stator core comprising: a pair of annular members each having a side formed to receive one end of the core and each having an inner diameter at least as great as the diameter of the slotted part of the core, said members being respectively adapted to be positioned at the ends of the core with their formed sides thereagainst and adapted to be moved axially away from said core, means for securing said members together when they are positioned at the respective core ends, each of said members including two groups of circumferentially equispaced slots extending radially across said one side of each member, and a plurality of finger members respectively having their ends pivotably arranged within said slots, the pivoted end of each finger member having a flat portion provided and arranged to be positioned against the end of the core when said annular member are secured together, each finger member having a curved portion arranged to extend out of the radially inner part of one of said slots substantially axially away from the core when said flat portion of the finger member is positioned against an end of the core, said finger members extending radially inwardly and then outwardly as the axial distance from the core increases thereby to provide a recess to receive the end turns of a coil wound in the slots of the core, said finger members engaging said end turns and being cammed from a position radially inwardly of said end turns to a position radially outwardly thereof upon the movement of said annular members axially away from said core thereby to permit the separation of said annular members from said core.

8. A winding form for use in a winding machine of the type which winds coils directly into the slots of a dynamoelectric machine stator core comprising: a pair of annular members each having a side with a circular recess formed therein to receive one end of the core and each having an inner diameter at least as great as the diameter of the slotted part of the core, said members being respectively adapted to be positioned at the ends of the core with the formed side thereagainst and adapted to be moved axially away from said core, means formed on said members for securing them together when they are positioned at the respective core ends, each of said members including two groups of circumferentially equispaced radially extending slots formed in said one side, a plurality of finger members respectively having their ends pivotably secured within said slots, each of said finger members having a flat portion adjacent said pivoted end arranged to extend out from said slot against the end of the core when said annular members are secured together, each of said finger members further having a curved portion extending substantially axially away from the core when said flat portion is against the end of the core, each of said curved portions being curved first inwardly and then outwardly thereby to form a recess to receive the end turns of a coil wound in the slots of the core, means formed on said annular members to predetermine their arcuate position relative to the core and to cause each finger member to be positioned between two slots of the core, said curved portion engaging said end turns and being cammed from a position radially inwardly of said end turns to a position radially outwardly thereof upon the movement of said annular members axially away from said core, thereby to permit the separation of said annular members from said core.

9. A winding form for use in a winding machine of the type which winds coils directly into the slots of a dynamoelectric machine stator core, an annular member having a side formed to receive one end of the core and being adapted to be positioned at an end of the core with its formed side thereagainst and adapted to be moved axially away from said core, a plurality of finger members each formed with an outer surface for receiving and positioning the end turns of a coil wound in the slots of the core, means for mounting said finger members on said annular member for angular movement relative thereto, said finger members extending substantially axially away from the core when said annular member is positioned at an end thereof, said outer surfaces engaging said end turns for angularly moving said finger members from a position radially inwardly of said end turns to a position radially outwardly thereof upon the movement of said annular member axially away from said core, thereby to permit the separation of said annular member from said core.

10. A winding form for use in a winding machine of the type which winds coils directly into the slots of a dynamoelectric machine stator core, an annular member having a side formed to receive one end of the core and having an inner diameter at least as great as the diameter of the slotted part of the core, said member being adapted to be positioned at an end of the core with its formed side thereagainst and adapted to be moved axially away from said core, a plurality of finger members each formed with an outer curved surface for receiving and positioning the end turns of a coil wound into the slots of a core, means for mounting said finger members on said annular member for turning movement relative thereto, said finger members extending substantially axially away from the core when said annular member is positioned at an end thereof, said outer curved surfaces engaging said end turns for camming said finger members from a position radially inwardly of said end turns to a position radially outwardly thereof upon the movement of said annular member axially away from said core, thereby to permit the separation of said annular member from said core.

11. A winding form for use in a winding machine of the type which winds coils directly into the slots of a dynamoelectric machine stator core, an annular member having a side formed to receive one end of the core and having an inner diameter at least as great as the diameter of the slotted part of the core, said member being adapted to be positioned at an end of the core with its formed side thereagainst and adapted to be moved axially away from said core, said member having a plurality of substantially radially extending recesses formed along said one side, a plurality of finger members each having a curved portion, said finger members being respectively pivotably mounted within said recesses so that said curved portions extend substantially axially away from the core at the inner edge of said annular member when it is positioned at an end of the core, said curved portion having an outer surface for receiving and positioning the end turns of a coil wound in the slots of the core, said outer surfaces engaging said end turns for camming said finger members from a position radially inwardly of said end turns to a position radially outwardly thereof upon the movement of said annular member axially away from said core, thereby to permit the separation of said annular member from said core.

12. A winding form for use in a winding machine of the type which winds coils directly into the slots of a dynamoelectric machine stator core, an annular member having a side formed to receive one end of the core and having an inner diameter at least as great as the diameter of the slotted part of the core, said member being adapted to be positioned at an end of the core with its formed side thereagainst and adapted to be moved axially away from said core, said member having two groups of circumferentially equispaced recesses extending inwardly from said one side, a plurality of finger members pivotally secured within said recesses so as to extend substantially axially away from the core when said annular member is positioned at an end thereof, said finger members having outer curved surfaces for receiving and positioning the end turns of the coil wound in the slots of the core, said outer curved surfaces engaging said end turns for camming said finger members from a position radially inwardly of said end turns to position radially outwardly thereof upon the movement of said annular member axially away from said core, thereby to permit the separation of said annular member from said core.

References Cited in the file of this patent

UNITED STATES PATENTS

| | | |
|---|---|---|
| 1,798,980 | Kayser | Mar. 31, 1931 |
| 1,977,828 | Laib et al. | Oct. 23, 1934 |
| 2,304,520 | Wirtz et al. | Dec. 8, 1942 |
| 2,573,976 | Linders | Nov. 6, 1951 |
| 2,578,495 | Wirth | Dec. 11, 1951 |
| 2,738,136 | Bugg | Mar. 13, 1956 |

FOREIGN PATENTS

| | | |
|---|---|---|
| 735,951 | Great Britain | Aug. 31, 1955 |